United States Patent [19]

Grenier et al.

[11] Patent Number: 4,768,097
[45] Date of Patent: Aug. 30, 1988

[54] ELECTRO-OPTICAL PICK UP HAVING A CHARGE COUPLED SEQUENCER

[75] Inventors: Gilles Grenier, L'Hay-les-Roses; Jean-Pierre Merle, Orsay; Robert Zribi, Paris, all of France

[73] Assignee: Societe Nationale Industrielle et Aerospatiale, Paris, France

[21] Appl. No.: 10,541

[22] Filed: Feb. 3, 1987

[30] Foreign Application Priority Data

Feb. 7, 1986 [FR] France .................... 86 01714

[51] Int. Cl.$^4$ ................................ H04N 3/14
[52] U.S. Cl. .......................... 358/213.26; 358/909
[58] Field of Search .................. 358/213.26, 213.27, 358/213.23, 209, 180, 909

[56] References Cited

U.S. PATENT DOCUMENTS 4,426,664  1/1984  Nagumo et al. ............ 358/213.26
4,644,405  2/1987  Roy et al. .................. 358/213.26

Primary Examiner—Jin F. Ng
Assistant Examiner—Stephen Brinich
Attorney, Agent, or Firm—Fisher, Christen & Sabol

[57] ABSTRACT

This invention relates to an electro-optical pickup of the type incorporating a charge coupled device. The invention has a sequencer that controls the successive acquisition by the photosensitive zone of a plurality n of images. The sequencer transfers into the intermediate memory zone, after formation of each of the images, a part of this image constituted by a number of lines m less than or at the most equal to the ratio M/n between the number M of lines of the intermediate memory zone and the number n of the images. The sequencer accumulates the partial images in the intermediate memory zone. The sequencer controls, via the readout register, the complete transfer of the partial images from the intermediate memory zone into the outside memory means, as well as the distribution of the partial images in the outside memory means.

4 Claims, 2 Drawing Sheets

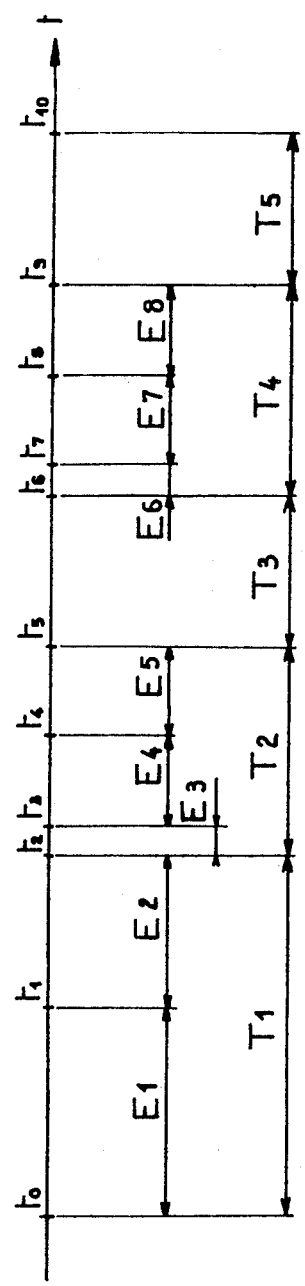
FIG. 2
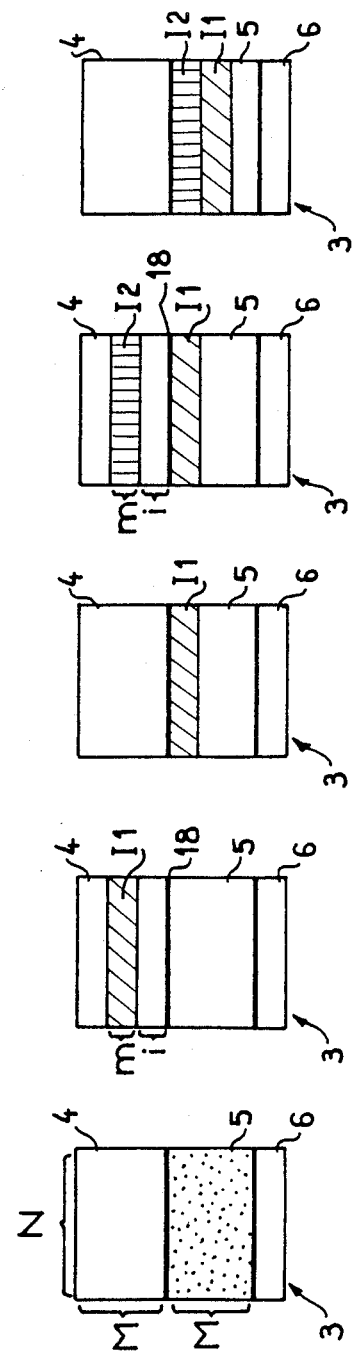

ELECTRO-OPTICAL PICK UP HAVING A CHARGE COUPLED SEQUENCER

The present invention relates to an opto-electronic pickup incorporating a charge coupled device, of the type generally designated by the term CCD pickup.

Opto-electronic pickups of this type are already known, which are constituted by:
- an optical system for forming an optical image;
- a photosensitive CCD matrix detector of the frame transfer type, i.e. comprising:
  - a photosensitive zone, constituted by a plurality of lines of photosensitive elements totally illuminated by said optical system and generating an electric image by integration of the electric charges generated by the photons received by said photosensitive elements, said electric image being constituted by lines of electric image information;
  - an intermediate memory zone, constituted by a plurality of lines of memory elements and in which said electric image information contained in the lines of said photosensitive zone are transferred line to line; and
  - a readout register in which the electric image information corresponding to the lines of the intermediate memory zone are transferred in parallel, said readout register generating a series video signal representative of the optical image received by said photosensitive zone;
- memory means outside said matrix detector; and
- a sequencer controlling the acquisition of said electric images by said photosensitive zone and capable of managing in independent manner the transfers of the lines of electric information within said photosensitive zone, within said intermediate memory zone and within said readout register, and therefore the transfers between said photosensitive zone and said intermediate memory zone, between said intermediate memory zone and said readout register and between said readout register and said outside memory means.

In these known pickups, an image formed on said photosensitive zone is transferred into said intermediate memory zone, then read by said readout register, then stored in said outside memory means.

In this way, the image pickup frequency is limited by the readout time of said pickups: in fact, an image is pickable only after the end of readout of the preceding image.

Now, it would be advantageous, for certain uses of such pickups, to be able to pick up at least two successive images of which the time proximity is less than the readout time of these pickups.

It is therefore an object of the present invention to provide an optical pickup incorporating charge coupled devices which allows a plurality of successive, temporally very close images to be picked up.

To this end, according to the invention, the optical pickup of the type described hereinabove is noteworthy in that said sequencer:
- controls the successive acquisition by said photosensitive zone of a plurality of images;
- transfers into said intermediate memory zone, after formation of each of said images, a part of this image constituted by a number of lines less than or at the most equal to the ratio between the number of lines of said intermediate memory zone and said number of said images;
- accumulates said partial images in said intermediate memory zone; and
- controls, via said readout register, the complete transfer of said partial images from said intermediate memory zone into said outside memory means, as well as the distribution of said partial images in said outside memory means.

The present invention thus enables an opto-electronic CCD pickup to be produced, which is capable of picking up two or more successive and temporally very close images, followed by a common memorization in said intermediate memory zone, whilst awaiting a deferred readout. Temporal separation of these images is effected during readout by said register, at the moment of memorization in said outside memory means, intended to allow a subsequent processing of said images.

It will be noted that the minimum time possible between the pickups of two successive images may be very short, since it corresponds to the time of transfer of the lines from the photosensitive zone into the intermediate memory zone. For example, if the photosensitive zone comprises 144 lines and if the line transfer may be effected at 2 MHz, this minimum time is only 72.2 microseconds.

The opto-electronic pickup according to the invention is thus particularly well adapted to follow phenomena with very rapid fluctuations. In fact, it allows the acquisition of two temporally very close images of very short duration of exposure (for example 50 microseconds); consequently, two images are obtained of which the comparison makes it possible to detect a very brief phenomenon appearing during the pickup of one of them.

In order to be able to take advantage of this very short minimum time possible between the pickup of two successive images, according to another feature of the present invention, said sequencer controls the acquisition, by said photosensitive zone, of the first of said images during the time gap separating, in the return to zero of said photosensitive matrix detector, the end of the return to zero of said photosensitive zone and the end of the return to zero of said intermediate memory zone.

It is particularly advantageous if said photosensitive zone is provided, at least at its boundary with said intermediate memory zone, with an anti-glare system incorporated therein and if, during the transfer of the lines of image information from said photosensitive zone into said intermediate memory zone, said sequencer controls the transfer of lines both in said photosensitive zone and in said intermediate memory zone for these lines of information corresponding to a partial image, but blocks the transfer of the lines into said intermediate memory zone whilst controlling this transfer of lines into said photosensitive zone for the lines of information not belonging to this partial image.

In this way, the parasitic charges not belonging to this partial image are eliminated and only said partial image is transferred into said intermediate memory zone.

It is known that these anti-glare systems, also called anti-blooming systems, are constituted by drains or diodes and are charged, in the known CCD pickups, with evacuating excess charges. Within the scope of the invention, the anti-glare system, associated with a selective control of the transfers into the photosensitive zone and into the intermediate memory zone, allows the transfer of the partial image information alone.

In an advantageous embodiment, the opto-electronic pickup according to the present invention comprises an outside processing unit, incorporating said outside memory means and generating the parameters of acquisition of said images, parameters that said outside processing unit addresses to said sequencer. These image acquisition parameters are for example the duration of exposure for each image, the image pickup synchronization, the synchronization of readout of the intermediate zone, etc. . . They may also concern the validation of a particular zone of a partial image by the sequencer, in order to limit the number of image dots to be memorized and processed.

Furthermore, it is advantageous if the sequencer of the pickup according to the invention is programmable, so that it may operate either in the manner described hereinabove according to the invention, or in known manner with immediate readout of the intermediate memory zone as soon as an image has been transferred thereto from the photosensitive zone.

It will be noted that, in order to accelerate the return to zero of the intermediate memory zone, it may be possible to compact, in known manner, several lines in the readout register, before said zone is read out.

The invention will be more readily understood on reading the following description with reference to the accompanying drawings, in which:

FIG. 2 is a partial timing diagram of the operation of the optical pickup of FIG. 1.

Figure 1:
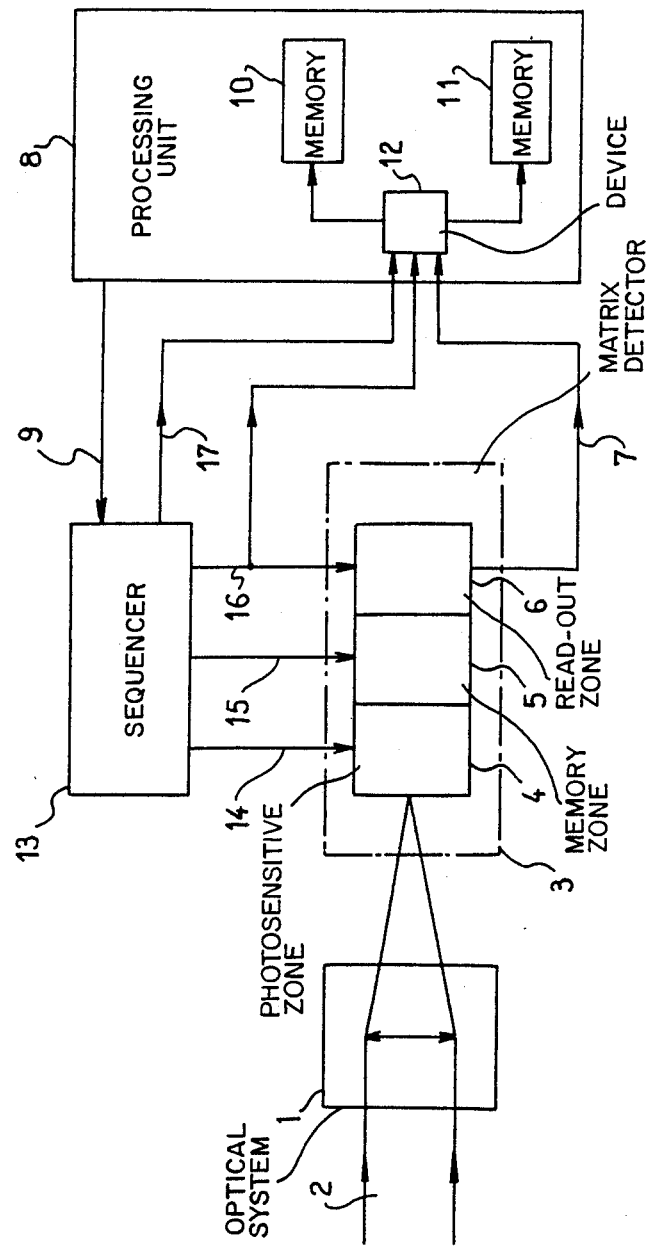
FIG. 1 is a block diagram of an embodiment of the optical CCD pickup according to the invention, for picking up two successive images.

FIGS. 3a to 3e schematically illustrate the state of the CCD matrix detector of the optical sensor of FIG. 1, at several instants of the timing diagram of FIG. 2.

Referring now to the drawings, the CCD optical pickup according to the invention and schematically shown in FIG. 1, is constituted by:

an optical system 1, receiving a light beam 2 coming from an object (not shown) and capable of forming an optical image of said object;

a photosensitive matrix detector 3 of the CCD (frame transfer) type, and incorporating an anti-glare system itself formed by:

a photosensitive zone 4 which is constituted by a plurality of lines of photosensitve elements and on the whole of which said optical system 1 forms said image; this photosensitive zone 4 is adapted to integrate the electric charges generated by the photons of said image in order to generate image information in electric form;

an intermediate memory zone 5, which is constituted by a plurality of lines of memory elements and into which are transferred, line to line, said electric image information contained in the lines of said photosensitive zone; and a readout register 6, in which the electric image information corresponding to each line of the intermediate memory zone 5 are transferred in parallel, said readout register 6 generating, at its output 7, a video signal representative of the image received from the optical system 1 by the photosensitive zone 4;

a processing unit 8, outside said matrix detector 3 and generating, at its output 9, the parameters defining the acquisition of the images, such as duration of exposure of the images, image pickup synchronization, synchronization of readout, etc. . . ;

two memories 10 and 11 of which the access is controlled by a common control device 12; memories 10 and 11 and device 12 are outside the matrix detector 3 and are advantageously incorporated in the processing unit 8; and a sequencer 13 receiving from the output 9 of the processing unit 8 said image acquisition parameters and charged with controlling the image pickup by the photosensitive zone 4 and with managing the information transfers.

To that end, sequencer 13 comprises in particular:

an output 14 on which appears a signal addressed to the photosensitive zone 4 and intended to progress line by line the electric image information within said photosensitive zone 4 in the direction of the intermediate memory zone 5;

an output 15 on which appears a signal addressed to the intermediate memory zone 5 and intended to progress line by line the electric image information within said intermediate memory zone 5 in the direction of said readout register 6;

an output 16 on which appears a signal addressed to the readout register 6 and intended to control the latter so that it addresses to memories 10 and 11, via its output 7 and the control device 12, a series video signal from the parallel information that it receives from the intermediate memory zone 5. Furthermore, the output 16 is also connected to said control device 12 of said memories 10 and 11; and an output 17 on which appears a validation signla addressed to said control device 12.

Each of the signals appearing at outputs 14, 15 and 16 of sequencer 13 is constituted by a series of pulses of constant frequency, each pulse corresponding to a passage from one line to the following (for zones 4 and 5) or to the transformation of a parallel line into a series line (for the readout register 6).

Operation of the pickup according to the invention is explained hereinafter, with the aid of the timing diagram of FIG. 2 and the diagrams of FIGS. 3a to 3e. On these latter diagrams, it has been assumed that each of the photosensitive zone 4 and memory zone 5 comprised M lines of N photosensitive elements or memories, respectively.

This operation comprises five principal phases, respectively referenced T1 to T5 on the timing diagram of FIG. 2.

(A) Phase T1

This first phase extends from the initial instant t0 to an instant t2 and it corresponds to the return to zero of the detector 3, as well as to the pickup of a first image. It is subdivided into two consecutive steps, namely:

a first step E1 extending from initial instant t0 to an instant t1, prior to t2. During this step E1, the sequencer 13 emits signals at each of its outputs 14, 15 and 16. Consequently:

the M lines of photosensitive zone 4 are transferred line to line into the intermediate memory zone 5;

the M lines of the intermediate memory zone 5 are transferred line to line into the readout register 6;

the readout register 6 emits at its output 7, in series form, a video signal constituted by the information contained initially in the intermediate memory zone 5. No validation signal appears at the output 17 of the sequencer 13, with the result that this video signal is not taken into account by the control device 12 and is not recorded in one or the other of memories 10 or 11.

At the end of this first step E1, i.e. at instant t1, the photosensitive zone 4 is entirely emptied of the information that it contained, whilst the intermediate memory zone 5 is in the course of emptying and of read-out (by register 6) of the information which was initially contained in the photosensitive zone 4 and which was transferred thereto during step E1.

FIG. 3a schematically illustrates the state of the detector 3 at instant t1. In this Figure, the intermediate memory zone 5 in the course of emptying has been shown dotted.

- a second step E2 extending from instant t1 to instant t2, at which phase T1 terminates. During this second step E2, the sequencer 13 continues to emit signals at its outputs 15 and 16, but no longer emits any signal on its output 14. Consequently:

emptying of the intermediate memory zone 5 continues under the same conditions as those described previously in the first step E1;

there is formed in the photosensitive zone 4 an integrated image during the time gap t2-t1 and covering the whole of the photosensitive zone 4. Of this image, according to the invention, only a first partial image I1 will be retained, occupying m lines of said photosensitive zone, with $m \leq M/2$.

At the end of this second step E2, i.e. at instant t2, the intermediate memory zone 5 is completely emptied, whilst the photosensitive zone 4 comprises an image, of which the interesting part constituting said first partial image I1, is separated from the intermediate memory zone 5 by i lines. FIG. 3b schematically illustrates the state of detector 3 at instant t2. In this Figure, only part I1 of the image contained in the photosensitive zone 4 has been shown (by a hatched rectangle).

(B) Phase T2

This second phase extends from instant t2 to a later instant t5 and it corresponds to the memorization of the partial image I1 in the intermediate memory zone 5. It is subdivided into three consecutive steps, namely

- a first step E3 extending from said instant t2 to a later instant t3 and during which the sequencer 13 emits a signal at its output 14, without emitting on its outputs 15 and 16. Consequently, the i lines of photosensitive zone 4, disposed between the partial image I1 and the intermediate memory zone 5 are advanced step by step in the direction of this latter, without, however, being able to penetrate therein, since no transfer signal is present on the output 15. These i lines accumulate at the boundary 18 between said zones 4 and 5 and the anti-glare system located at that spot evacuates the charges from said lines. Advance of these i lines is terminated at instant t3 and the partial image I1 has then come into position adjacent said intermediate memory zone 5, remaining in the photosensitive zone 4.
- a second step E4 extending from instant t3 to a later instant t4 and during which the sequencer 13 emits signals on its outputs 14 and 15, but not on its output 16. Consequently, the m lines of image T1 are transferred step by step into the intermediate memory zone 5. Transfer of the m lines of image I1 is terminated at instant t4 and the image I1 has then come into position adjacent the photosensitive zone 4, now being disposed in the intermediate memory zone 5.
- a third step E5 extending from instant t4 to instant t5 at which said phase T2 terminates. During this third step E5, the sequencer 13 emits a signal at its output 14, but no signal appears on its outputs 15 and 16. Consequently, the M-m-i lines of the photosensitive zone 4, disposed initially on the side of the partial image I1 opposite the intermediate memory zone 5, are transferred in the direction of this latter. However, as described previously concerning the i lines, these M-m-i lines accumulate at the boundary 18 and their charges are evacuated by the anti-glare system since the signal 15 is not present; the partial image I1 therefore remains in the position that it occupied at instant t4.

The advance of the preceding M-m-i lines in the direction of the intermediate memory zone 5 terminates at instant t5.

FIG. 3c illustrates the state of the detector 3 at instants t4 and t5, the only difference in state between these instants being that, at instant t5, all the lines of the photosensitive zone 4 have been transferred towards the intermediate memory zone 5.

(C) Phase T3

This third phase T3 extends from said instant t5 to a later instant t6. It corresponds to the pickup of a second image.

As described previously, at instant t5, the photosensitive zone 4 is totally emptied, with the result that a second image may be formed, integrated during the time gap t6-t5. Of this second image, as of the first, only a partial image I2 will be retained, occupying m lines of said photosensitive zone 4 and separated from the intermediate memory zone 5 by i lines.

FIG. 3d illustrates the state of the detector 3 at instant t6. In this Figure, only the second partial image I2 has been shown by a rectangle with straight hatching, to the exclusion of the rest of the image formed.

During phase T3, the sequencer 13 emits no signal at its outputs 14, 15 and 16. This results in particular in the first image I1 remaining in the position that it already occupied at instants t4 and t5.

(D) Phase T4

This fourth phase extends from instant t6 to a later instant t9 and it corresponds to the memorization of the second partial image I2 in the intermediate memory zone 5. It is subdivided into three consecutive steps E6, E7 and E8, respectively similar to steps E3, E4 and E5 of the second phase T2.

In fact:

the first step E6 of phase T4 extends from instant 6 to a later instant t7 and, during this first step, the sequencer 13 emits a signal at its output 14, whilst no signal is present at outputs 15 and 16. Consequently, the i lines of the photosensitive zone 4, disposed between the image I2 and the intermediate memory zone 5, are advanced step by step towards this latter and their charges are evacuated by the anti-glare system of the boundary 18. Advance of these i lines terminates at instant t7 and the second partial image I2 has then come into position adjacent said intermediate memory zone 5, whilst remaining in the photosensitive zone 4.

As for the first image I1, it remains in the position that it already occupied at instants t4, t5 and t6;

the second step E7 of phase T4 extends from instant t7 to a later instant t8 and, during this second step, the sequencer 13 emits signals on its outputs 14 and 15, but not on its output 16. Consequently, the m lines of the first partial image I1 are offset step by step, within the intermediate memory zone 5, in the direction of the readout register 6, whilst the m lines of the second partial image I2 are transferred step by step, from the photosensitve zone 4 to the intermediate memory zone 5. Transfer of the two images I1 and I2 terminates at instant t8 and these two images are then adjacent each other and both disposed in said intermediate memory zone 5, the second partial image I2 having taken the place of the first partial image I1 and the latter having been offset by m lines towards the readout register 6.

FIG. 3e illustrates the positions of images I1 and I2 at instant t8;

the third step E8 of phase T4 extends from instant t8 to instant t9, at which said fourth phase T4 terminates. During this third step E8, the sequencer 13 emits a signal at its output 14, but no signal appears on its outputs 15 and 16. Consequently, the M-m-i lines of photosensitive zone 4, initially disposed on that side of the image I2 opposite the intermediate memory zone 5, are advanced in the direction of this latter and their charges are evacuated by the anti-glare system of the boundary 18.

At the end of the third step E8, i.e. at instant t9, the process of transfer from the photosensitive zone 4 towards the intermediate memory zone 5 is terminated. The partial images I1 and I2 have not been displaced and they still occupy the position acquired at instant t8 and shown in FIG. 3e.

(E) Phase T5

The fifth phase T5 extends from instant t9 to instant t10 and corresponds to the readout of the contents of the intermediate memory zone 5 by the readout register 6. During this phase T5, the sequencer 13 emits signals on its outputs 15 and 16, with the result that said partial images I1 and I2 are advanced towards the register 6, then transferred thereinto, which addresses them, by its output 7, towards memories 10 and 11. Thanks to the link between the output 16 of the sequencer 13 and the control device 12, the video signal at said output 7 of the readout register 6 is sampled and synchronized by the readout signal appearing at output 16. Furthermore, the validation signal, emitted by sequencer 13 on its output 17 and addressed to the control device 12, allows the separation of the two partial images I1 and I2, with the result that one, for example I1, may be stored in memory 10, whilst the other, for example I2, may be stored in memory 11. It is seen that the images are read out and registered in their pickup order.

At the end of phase T5, i.e. at instant t10, memorization of partial images I1 and I2 is terminated.

Images I1 and I2 are then memorized in memories 10 and 11 whilst awaiting subsequent exploitation.

It is thus seen that, thanks to the invention, an optical pickup is produced which makes it possible to make two successive images without having to effect an intermediate readout. These two images may therefore be temporally very close.

Operation of the pickup may, of course, be cyclic, with pickup and storage of two images at each cycle.

What is claimed is:

1. In an opto-electronic pickup incorporating a charge coupled device, comprising:
    an optical system for forming an optical image;
    a photosensitive CCD matrix detector of the frame transfer type, comprising:
        a photosensitive zone, constituted by a plurality of lines of photosensitive elements totally illuminated by said optical system and generating an electric image by integration of the electric charges generated by the photons received by said photosensitive elements, said electric image being constituted by a plurality of lines of electric image information;
        an intermediate memory zone, constituted by a plurality M of lines of memory elements and in which said electric image information contained in the lines of said photosensitive zone are transferred line to line; and
        a readout register in which the electric image information corresponding to lines of the intermediate memory zone are transferred in parallel, said readout register generating a series video signal representative of the optical image received by said photosensitive zone;
    memory means outside said matrix detector; and
    a sequencer controlling the acquisition of said electric images by said photosensitive zone and capable of managing in independent manner the transfers of the lines of electric information within said photosensitive zone, within said intermediate memory zone and within said readout register, and therefore the transfers between said photosensitive zone and said intermediate memory zone, between said intermediate memory zone and said readout register and between said readout register and said outside memory means, said sequencer:
    controls the successive acquisition by said photosensitive zone of a plurality n of images;
    transfers into said intermediate memory zone, after formation of each of said images, a part of this image constituted by a number of lines m less than or at the most equal to the ratio M/n between the number M of lines of said intermediate memory zone and said number n of said images;
    accumulates said partial images in said intermediate memory zone; and
    controls, via said readout register, the complete transfer of said partial images from said intermediate memory zone into said outside memory means, as well as the distribution of said partial images in said outside memory means.

2. The opto-electronic CCD pickup of claim 1, wherein said sequencer controls the acquisition, by said photosensitive zone, of the first of said images during the time gap separation the time when said photosensitive matrix detector returns to zero and the time when said photosensitive zone and said intermediate memory zone reach zero.

3. The opto-electronic CCD pickup of claim 1, wherein said photosensitive zone is provided, at least at its boundary with said intermediate memory zone, with an anti-glare system incorporated therein, and, during transfer of the lines of image information from said photosensitive zone into said intermediate memory zone, said sequencer controls the transfer of lines both in said photosensitive zone and in said intermediate memory zone for the lines of information corresponding to a partial image, but blocks the transfer of lines into said intermediate memory zone whilst controlling the transfer of lines into said photosensitive zone for the lines of information not belonging to this partial image.

4. The opto-electronic CCD pickup of claim 1, wherein it comprises an outside processing unit, incorporating said outside memory means and generating the parameters of acquisition of said images, parameters that said outside processing unit addresses to said sequencer.

* * * * *